United States Patent
Wang et al.

(10) Patent No.: US 9,822,027 B2
(45) Date of Patent: Nov. 21, 2017

(54) GLASS FURNACE WITH BOTTOM MATERIAL FEED

(71) Applicant: Owens-Brockway Glass Container Inc., Perrysburg, OH (US)

(72) Inventors: Zhongming Wang, Ypsilanti, MI (US); Scott Weil, Maumee, OH (US); Tilak Gullinkala, Perrysburg, OH (US); Udaya Vempati, Perrysburg, OH (US); Shivakumar S. Kadur, Perrysburg, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 263 days.

(21) Appl. No.: 14/262,113

(22) Filed: Apr. 25, 2014

(65) Prior Publication Data
US 2015/0307382 A1    Oct. 29, 2015

(51) Int. Cl.
C03B 3/02    (2006.01)
C03B 3/00    (2006.01)
C03B 5/04    (2006.01)
C03B 5/235   (2006.01)

(52) U.S. Cl.
CPC ............ C03B 3/023 (2013.01); C03B 3/005 (2013.01); C03B 3/026 (2013.01); C03B 5/04 (2013.01); C03B 5/2356 (2013.01)

(58) Field of Classification Search
CPC .............. C03B 3/00; C03B 3/02; C03B 3/023
See application file for complete search history.

(56) References Cited

U.S. PATENT DOCUMENTS

| | | | |
|---|---|---|---|
| 1,761,229 A | 6/1930 | Pedersen | |
| 1,834,631 A | 12/1931 | Mulholland | |
| 1,905,534 A | 4/1933 | Wadman | |
| 1,953,023 A * | 3/1934 | Vergil | C03B 3/02 65/136.1 |
| 1,970,112 A | 9/1934 | Wadman | |
| 1,999,761 A | 4/1935 | Howard | |
| 2,354,807 A | 8/1944 | Fox et al. | |
| 2,479,805 A | 6/1949 | Batchelf | |
| 2,512,761 A | 6/1950 | Arbeit | |

(Continued)

FOREIGN PATENT DOCUMENTS

| | | |
|---|---|---|
| EP | 0135446 | 3/1985 |
| JP | 2003183031 | 7/2003 |

(Continued)

OTHER PUBLICATIONS

PCT International Search Report and Written Opinion, Int. Serial No. PCT/US2015/027440, Int. Filing Date: Apr. 24, 2015, Applicant: Owens-Brockway Glass Container Inc., dated Aug. 7, 2015.

*Primary Examiner* — Cynthia Szewczyk

(57) ABSTRACT

A glass furnace includes a furnace chamber for containing glass melt and a screw conveyor for receiving glass batch material and feeding the glass batch material to the furnace chamber. A dam wall is disposed with respect to the screw conveyor such that batch material from the screw conveyor must flow upward over the dam wall before entering the furnace chamber. The top of the dam wall may be below the level of the melt pool in the furnace chamber.

44 Claims, 2 Drawing Sheets

(56) References Cited

U.S. PATENT DOCUMENTS

| | | | | |
|---|---|---|---|---|
| 2,564,783 A | * | 8/1951 | Howard | C03B 3/02 373/29 |
| 2,597,585 A | * | 5/1952 | Howard | C03B 3/02 432/13 |
| 2,749,666 A | | 6/1956 | Baque | |
| 3,039,231 A | | 6/1962 | Augsburger et al. | |
| 3,260,587 A | * | 7/1966 | Marceau | C03B 5/2356 122/6 R |
| 3,523,780 A | | 8/1970 | Plumat | |
| 3,573,337 A | | 4/1971 | Grimm et al. | |
| 4,226,564 A | | 10/1980 | Takahashi et al. | |
| 4,290,797 A | | 9/1981 | Rossi | |
| 4,381,934 A | | 5/1983 | Kunkle et al. | |
| 4,594,089 A | | 6/1986 | Kurata | |
| RE32,317 E | | 12/1986 | Kunkle et al. | |
| 4,654,068 A | | 3/1987 | Kunkle et al. | |
| 4,789,990 A | | 12/1988 | Pieper | |
| 4,921,521 A | * | 5/1990 | Kremenets | C03B 3/02 65/135.8 |
| 4,929,266 A | | 5/1990 | Cozac et al. | |
| 5,057,140 A | | 10/1991 | Nixon | |
| 5,078,777 A | | 1/1992 | Cozac et al. | |
| 5,157,685 A | * | 10/1992 | Jensen | C03B 3/026 219/121.35 |
| 5,672,190 A | | 9/1997 | Litka et al. | |
| 5,947,887 A | * | 9/1999 | White | A62D 3/33 405/129.2 |
| 6,532,768 B1 | | 3/2003 | Labrot et al. | |
| 7,024,888 B2 | | 4/2006 | Rake et al. | |
| 2009/0158777 A1 | * | 6/2009 | Tenzler | C03B 3/02 65/134.4 |

FOREIGN PATENT DOCUMENTS

| | | |
|---|---|---|
| JP | 2010222217 | 10/2007 |
| LU | 77649 | 3/1979 |
| WO | 2014036979 | 3/2014 |

* cited by examiner

GLASS FURNACE WITH BOTTOM MATERIAL FEED

The present disclosure is directed to an arrangement for feeding glass batch material into a furnace at a location below glass melt level to eliminate problems associated with the batch blanket that is otherwise formed on the top surface of the glass melt.

BACKGROUND AND SUMMARY OF THE DISCLOSURE

Typically, the natural gas burners that provide energy for a glass melting furnace, are located in the walls of the furnace. The flames from the burners extend across the width or the length of the furnace, slightly above and approximately parallel to the top surface of the glass melt within the furnace. Heat energy is transferred from the burner flames to the top surface of the glass melt primarily by conduction and radiation. In a typical furnace, raw batch materials are added to the furnace by distributing the raw materials on top of the existing glass melt, creating a batch 'blanket' of raw materials on the top surface of the glass melt. The raw batch materials consist of dry particles, ranging in grain size from approximately 0.02 to 1.0 mm.

Adding the raw batch materials into a glass furnace in this manner presents several operational difficulties. First, the dry batch materials are poor conductors of heat due to their low heat transfer coefficients and radiation emissive factors. As a result, the blanket of raw batch materials on the surface of the melt functions as an insulating layer that decreases the amount of heat energy that is transferred from the burners to the glass melt.

Another issue is the disturbance of the dry materials by the glass burner flames. The flow of air from the flames causes turbulence that disturbs and picks up the dry materials. The dry materials become entrained in the exhaust gases that exit the furnace flue or stack, a situation referred to as 'batch carryover', resulting in environmental air emissions such as opacity and particulate matter emissions. A third issue caused by the blanket of dry batch materials is the loss of light chemical elements such as sodium from the glass melt due to volatilization of these light elements. The loss of batch materials due to carryover or volatilization alters the chemistry of the glass melt, resulting in a final glass chemistry that is outside of the desired chemical specification, which alters the properties of the final glass product. To avoid these problems with dry batches, glass melting furnace feedstock is typically wetted with water (0-5% by weight). Although batch wetting mitigates many of the problems discussed herein, it can cause others such as poor batch transport conditions, segregation, and additional energy consumption in the glass melting furnace to drive off the added water. The present invention and application presents a solution to the aforementioned problems.

A general object in accordance with one aspect of the disclosure is to provide a raw batch material feeder for glass furnaces that eliminates the raw batch material blanket that may be formed on the top surface of the melt when batch material is fed onto the top surface of the melt, and the problems associated with such a batch blanket.

Another object in accordance with another aspect of the disclosure is to eliminate the raw batch material blanket that reduces the amount of heat energy that is transferred from the gas burners to the glass, thereby increasing the efficiency of the furnace, by increasing the amount of heat energy that is transferred from the burner flames to the glass melt.

Another object in accordance with another aspect of the disclosure is to eliminate the loss of light chemical elements such as sodium from glass melt due to volatilization at high temperature.

A still further object in accordance with another aspect of the disclosure is to eliminate batch carryover. The present disclosure embodies a number of aspects that can be implemented separately from, or in combination with, each other.

A glass furnace in accordance with one aspect of the disclosure includes a furnace melt chamber for melting the raw batch materials and containing the glass melt and a screw conveyor for receiving glass batch raw materials and feeding the glass batch raw materials into the furnace.

A dam wall may be disposed between the screw conveyor and the melt chamber. The dam wall creates a well prior to the melt chamber. Heaters may be located in the well. The screw conveyors feed the raw batch materials into the lower portion of the well for partial melting prior to entering the melt chamber. The partially melted raw materials flow upward over the dam wall out of the well and into the furnace chamber.

In accordance with another aspect of the disclosure, a glass furnace includes a furnace chamber for melting the raw materials and containing the glass melt, a plurality of feed chutes to introduce raw batch materials into the furnace chamber below the melt level, and a plurality of heaters that receive batch material from the feed chutes to raise the temperature of the batch material before it is introduced into the melt in the furnace melt chamber. The furnace also includes a dam wall establishing a well or series of wells prior to the melt chamber. The wells may include heaters.

In accordance with a further aspect of the disclosure, a glass furnace includes a furnace chamber for containing a glass melt and including a wall, a batch feed hopper adjacent to the wall of the furnace to supply raw batch materials under gravity, and a screw conveyor proximate to a bottom of the hopper to receive the raw batch materials. The furnace also includes a dam wall at the end of the screw conveyor to create a well from which the partially melted batch material flows upward, and a heater within the well to heat the batch material before flowing into the furnace melt chamber.

BRIEF DESCRIPTION OF THE DRAWINGS

The disclosure, together with additional objects, features, advantages and aspects thereof, will be best understood from the following description, the appended claims and the accompanying drawings, in which:

DETAILED DESCRIPTION OF PREFERRED EMBODIMENTS

Figure 1:
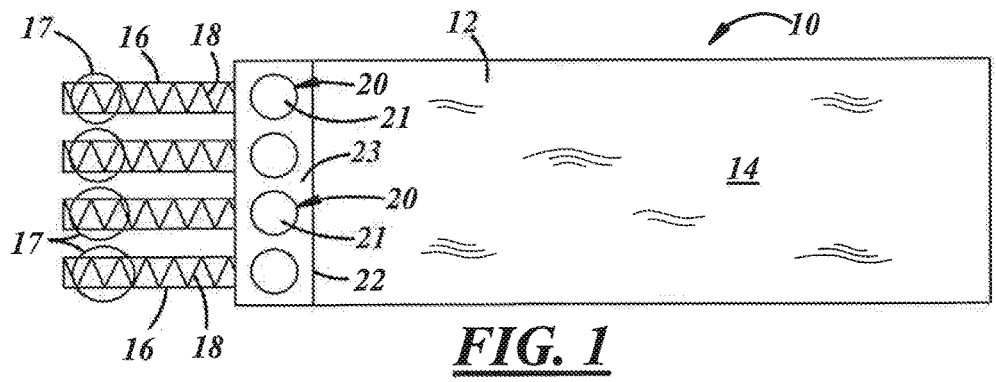
FIG. 1 is a schematic top view of a glass melting furnace having feed chutes for batch material connected to a bottom portion of the furnace.

FIG. 1 illustrates a schematic top view of a glass melting furnace generally designated by the reference numeral 10. The furnace has a furnace melt chamber 12 for melting the raw batch materials which in operation contains a pool 14 of molten glass as understood by those skilled in the art. One or more batch feed chutes 16 may be connected to the furnace 10, for example, at a bottom portion thereof. A batch feed inlet 17 may be coupled to each batch feed chute 16 for the introduction of raw batch materials to the feed chute. Each of the batch feed chutes 16 may contain a batch feeder such as a screw conveyor 18. Each of the batch feed chutes 16 may be coupled to a heater 20 having an outlet 21 as more fully described below. A dam wall 22 may be disposed between the screw conveyor 18 and the melt chamber 12. The dam wall 22 creates a well 23 or a series of wells prior to the melt chamber 12 and may contain the heaters 20. The dam wall 22 may be positioned between the heater outlets 21 and the remainder of the furnace and separates the heaters 20 and the heater outlets 21 from the remaining volume of the furnace 10.

Figure 2:
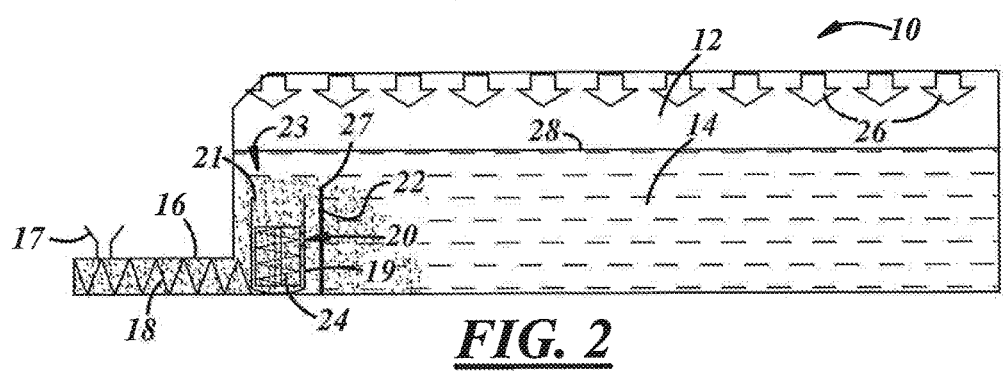
FIG. 2 is a side view of the glass melting furnace of FIG. 1 showing the feed chutes and the feed path for batch material fed into the bottom portion of the furnace.

FIG. 2 is a side view of the glass melting furnace 10 of FIG. 1 showing one of the batch feed chutes 16 and a feed path for raw batch materials fed into the furnace 10. Heat in the furnace 10 may be provided by top mounted heating elements 26 which may be powered by natural gas. Other types of heating elements may be used and in any suitable locations. An outlet of the feed chute 16 may be coupled to the heater 20.

The heater 20 may comprise an enclosure 19 which may have an outlet 21 on the top thereof, and a heating element contained within the enclosure 19. The heating element may comprise a gas or an electric heater element as desired. The heater 20 may also include an internal screw conveyor 24. The screw conveyor 24 may provide a flow of the raw batch material from the screw conveyer 18 of the feed chute 16 to the heater outlet 21. The heater 20 may be positioned in the well 23 within the furnace prior to the glass melt chamber 12 that may be established by the dam wall 22.

The dam wall 22 creates a well 23 in which the raw batch materials are heated and partially melted by the heaters in the well 23 before the batch flows over the dam wall 22 and enters the main volume of the furnace melting chamber 12. The top 27 of the dam wall 22 may be below the top surface of the glass melt level 28 in the furnace chamber 12. The melt level 28 may be an upper surface of the molten glass in the chamber 12.

In operation, raw batch materials are fed into the feed inlet 17 and the screw conveyor 18 transports the raw batch materials through the feed chute 16 into the heater 20. The heater 20 heats and partially melts at least some of the raw batch materials and a conveyor 24 in the heater 20 drives the batch material to the heater outlet 21 and into the lower portion of the well 23 formed by the dam wall 22 for partial melting prior to entering the melt chamber 12. The partially melted raw batch materials flow upward over the dam wall 22 out of the well 23 and into the furnace melt chamber 12.

The dam wall 22 creates a well in which $CO_2$ may be released from the raw materials as the heaters provide heat to and partially melt the raw materials. The release of $CO_2$ from the raw materials in the well reduces the amount of $CO_2$ bubbles that may form in the glass as the raw materials fully melt in the melt chamber. The removal of $CO_2$ bubbles from the molten glass is referred to as refining. Removal of the $CO_2$ in the well reduces the amount of time required to refine the glass in the melt chamber. As more partially melted batch material flows from the heater outlet 21 into the well 23, the melted batch material flows over the top 27 of the dam wall 22 into the melt pool 14 contained in the furnace chamber 12.

The height of the dam wall 22 can be varied to obtain different objectives. A short dam wall 22 will protect the feeder mechanism. A mid-height dam wall 22 will cause the batch material to be fed in the middle of the melt pool 14, or at the top surface of the melt pool 14. The percentage of batch material that is melted by the heater 20 in the mix of melted and unmelted batch material that flows over the dam wall 22 can be varied from approximately 25% to 75%, and more particularly from 40% to 50%, as desired.

Figure 3:
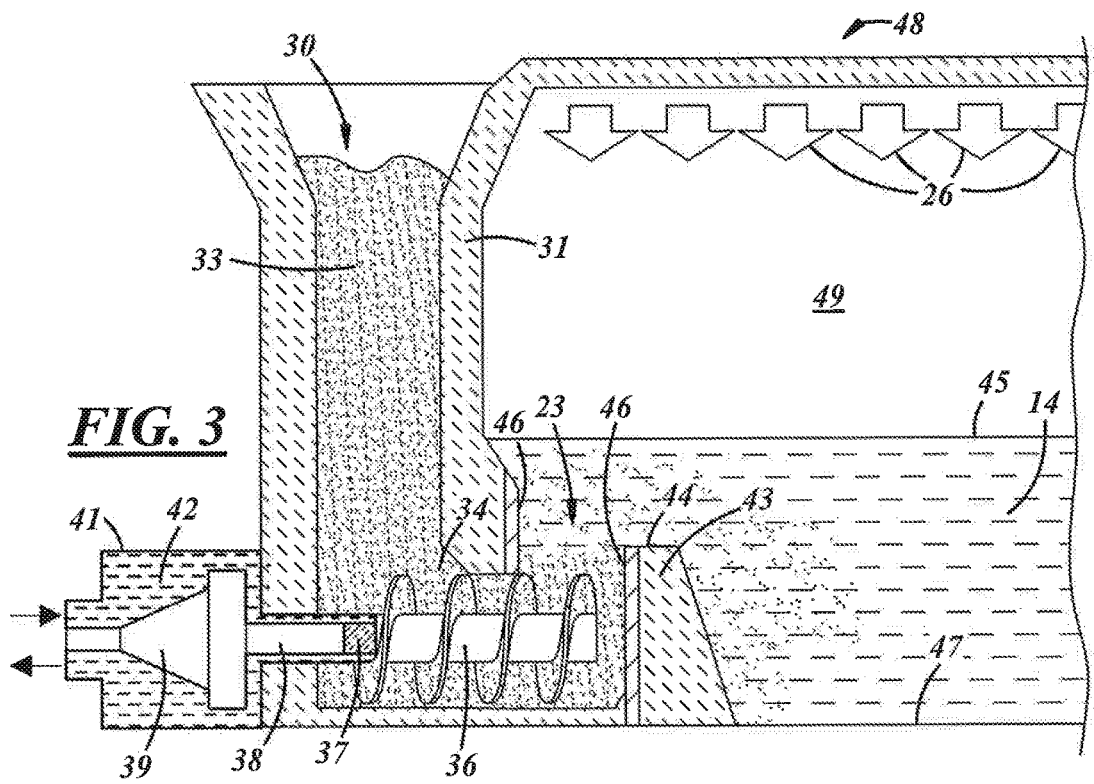
FIG. 3 is a side view of another illustrative embodiment of a glass melting furnace having a side mounted hopper that supplies batch material to a horizontal screw feeder and a batch material heater in a well that are located proximate to a bottom of the furnace.

FIG. 3 shows another illustrative embodiment of a glass melting furnace 48. This embodiment is similar in many respects to the embodiment of FIGS. 1-2, and like numerals among the embodiments generally designate like or corresponding elements throughout the several views of the drawing figures. Accordingly, the descriptions of the embodiments are incorporated into one another, and description of subject matter common to the embodiments generally may not be repeated here.

The glass melting furnace 48 has a chamber 49 in which a hopper 30 may be positioned adjacent to a wall 31 of the furnace chamber 49. The hopper 30 contains raw batch material 33 which is fed by gravity to a feed chamber 34 containing a screw conveyor 36, which may be carried at a level that is proximate a bottom portion 47 of the furnace 48. As used herein, the terminology proximate a bottom portion 47 may include at the bottom portion 47 or spaced apart therefrom but closer to the bottom than the top or at a position below the top surface of the molten glass pool 14 within the furnace chamber 49.

The screw conveyor 36 may be coupled by a high thermal resistance joint 37 to the output shaft 38 of a motor 39 contained in a motor housing 41. The motor housing 41 may be coupled to a source of cooling fluid 42 that circulates through the housing 41 to maintain the motor 39 at an acceptable operating temperature. The batch feed chamber 34 may be separated from the rest of the furnace chamber 49 by a dam wall 43. The top 44 of the dam wall 43 may be below the top surface of the melt level 45 in the furnace chamber 49. The height of the dam wall 43 can be varied to obtain different objectives. A short dam wall 43 will protect the screw conveyor 36 from the high temperatures of the melt pool 14 in the furnace chamber 49. A mid-height dam wall 43 will cause the batch material to be fed into the middle of the melt pool 14, and a high dam wall 43 will cause the batch material to be fed into the upper portion of the melt pool 14.

A heater 46 may be provided to heat the batch material in the feed chamber 34 and well 23 before it is driven over the top 44 of the dam wall 43. The heater 46 may span the gap between the dam wall 43 and the wall 31 of the furnace chamber 49 so that batch material exiting the feed chamber 34 may be forced through the heater 46. Alternatively, the heater 46 may be positioned on the side of the dam wall 43 facing the incoming batch material, and on the side of the furnace wall 31 that is in contact with the batch material within the well 23 so that batch material exiting the feed chamber 34 may be forced past the heater 46, or the heater 46 may be located in any other position. The heater 46 may be an electric heater, an induction heater, a gas radiation tube, or other suitable heating device.

In operation, gravity feeds batch material 33 from the hopper 30 into the feed chamber 34, and rotation of the screw conveyor 36 by the motor 39 drives the raw batch material 33 through the feed chamber 34 and upward through or past the heater 46. The heater 46 heats and partially melts at least some of the raw batch material 33 before it is introduced into the melt pool 14 in the furnace chamber 49. The outlet of the heater 46 may be below the melt level 45 in the furnace.

Figure 4:
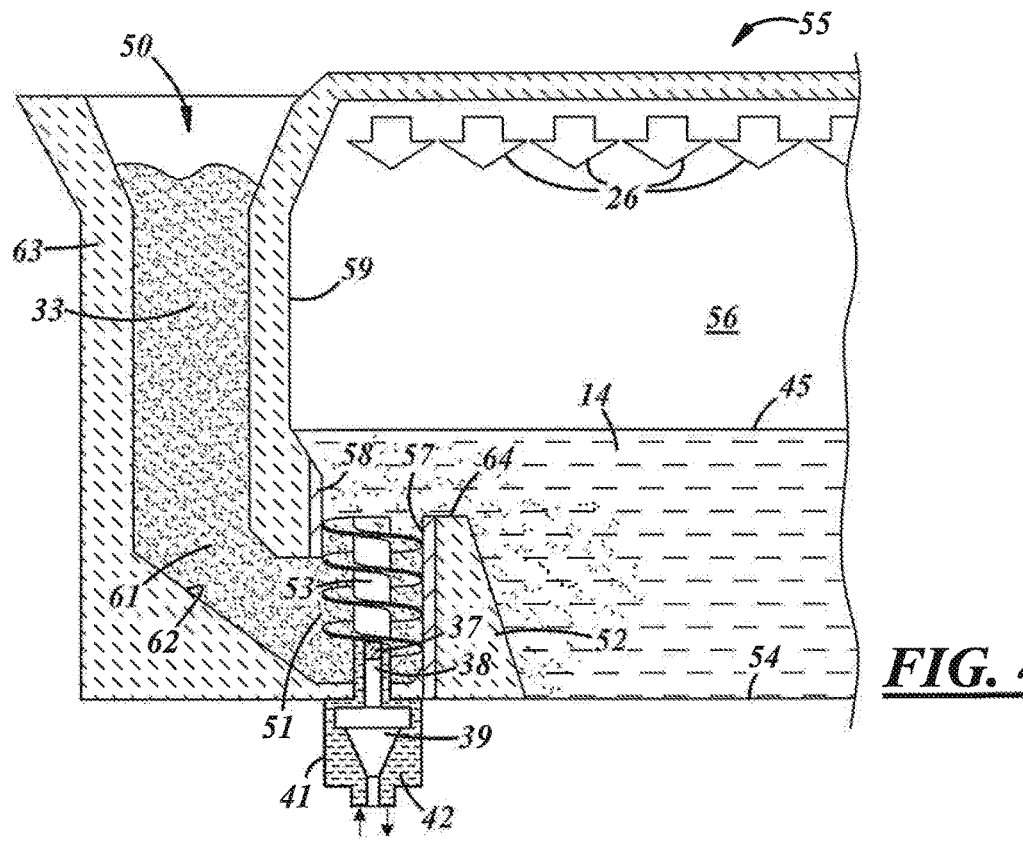
FIG. 4 is a side view of another illustrative embodiment of a glass melting furnace having a side mounted hopper that supplies batch material to a vertical screw feeder and a batch material heater and well that are located proximate the bottom of the furnace.

FIG. 4 shows an alternative embodiment of a glass melting furnace 55 having a furnace chamber 56 and a side mounted hopper 50 that supplies batch material 33 to a feed chamber that is part of a well 51 formed by a dam wall 52 located in the furnace chamber 56. The well 51 contains a vertical screw conveyor 53 that is located proximate the bottom wall 54 of the furnace 55, and heater elements 57 and 58 that are located on the side of the dam wall 52 and the side wall 59 of the furnace 55, respectively. Heat in the furnace 55 may be provided by top mounted heating elements 26. The batch material 33 in the hopper 50 is fed by gravity to a feed channel 61 having a sloped bottom feed wall 62 that is angularly related to the vertical side wall 63 of the hopper 50 and the bottom wall 54 of the furnace 55. The sloped bottom feed wall 62 may be angled between 30° and 60° to the bottom wall 54 of the furnace 55, and the sloped bottom feed wall 62 aids in maintaining an even flow of batch material 33 to the vertical screw conveyor 53.

The vertical screw conveyor 53 is arranged to convey batch material 33 upward from the well 51 to the top 64 of the dam wall 52. The vertical screw conveyor 53 may be coupled by a high thermal resistance joint 37 to the output shaft 38 of a motor 39 contained in a motor housing 41. The motor housing 41 may be coupled to a source of cooling fluid 42 that circulates through the motor housing 41 to maintain the motor 39 at an acceptable operating temperature. The well 51 is separated from the furnace chamber 56 by the dam wall 52. The top 64 of the dam wall 52 may be below a melt level 45 in the furnace chamber 56. The heater elements 57 and 58 heat the batch material flowing upward from the well 51 over the top 64 of the dam wall 52 into the melt pool 14 in the furnace chamber 56. The heater elements 57 and 58 may be an electric heater, an induction heater, a gas radiation tube, or other suitable heating device.

Figure 5:
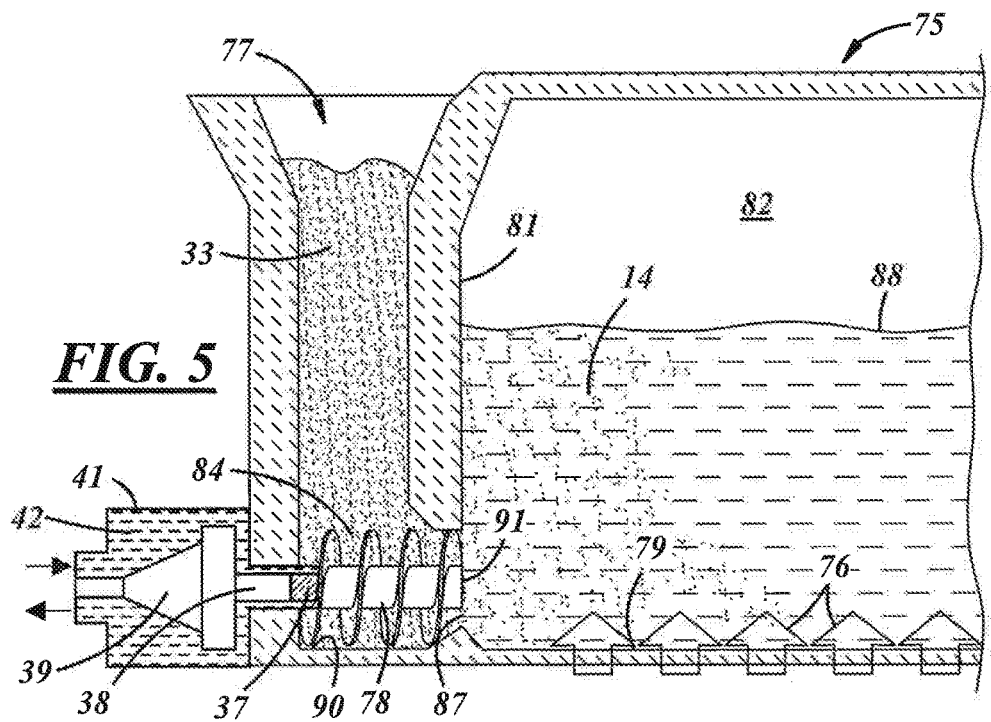
FIG. 5 is a side view of another illustrative embodiment of a glass melting furnace having submerged burners and a side mounted hopper that supplies batch material to a horizontal screw feeder located proximate a bottom of the furnace.

FIG. 5 shows another embodiment of a glass melting furnace 75 having a furnace chamber 82 including a side wall 81 and a bottom wall 79. The furnace chamber 82 contains a melt pool 14 of glass having a melt level 88. A batch feed hopper 77 is positioned adjacent to the side wall 81 of the furnace chamber 82 to supply batch material 33 under gravity to the bottom 84 of the hopper 77. A feed opening 87 in the side wall 81 of the furnace chamber 82 feeds batch material 33 from the bottom 84 of the hopper to the melt pool 14 of glass below the melt level 88. A screw conveyor 78 proximate the bottom wall 90 of the hopper 77 feeds the batch material 33 from the bottom 84 of the hopper through the feed opening 87 and into the furnace chamber 82. The screw conveyor 78 is oriented generally horizontally proximate the bottom wall 90 of the hopper. Submerged heaters 76 proximate the bottom wall 79 of the furnace chamber 82 heat the melt pool 14 of glass in the furnace chamber 82. The feed opening 87 defines a plane and is positioned below the melt level 88 in furnace chamber 82. The screw conveyor 78 may be coupled by a high thermal resistance joint 37 to the output shaft 38 of a motor 39 contained in a motor housing 41. The motor housing 41 may be coupled to a source of cooling fluid 42 that circulates through the housing 41 to maintain the motor 39 at an acceptable operating temperature. The end 91 of the screw conveyor 78 is in approximate alignment with the plane of the feed opening 87. The submerged burners 76 create turbulence in the melt pool 14 in the furnace chamber 82 to provide mixing of the batch material 33 with the melt pool 14 of glass in the furnace chamber 82 as it passes thorough the feed opening 87 into furnace chamber 82.

The present disclosure is directed to the concept of feeding glass batch material into a furnace at a location below the melt level to eliminate problems associated with the glass batch "blanket" otherwise formed on the top surface of the melt. A screw conveyor may be used to feed the batch material into the melt pool in the furnace.

There thus has been disclosed an apparatus for feeding batch material into the furnace below the top surface of the melt pool that fully satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. The disclosure is intended to embrace all such modifications and variations as fall within the spirit and broad scope of the appended claims.

The invention claimed is:

1. A glass furnace comprising:
   a melt chamber configured to contain a glass melt;
   a conveyor configured to receive glass batch material and feed such material to the melt chamber, wherein the conveyor is coupled to an output shaft of a motor surrounded by a motor housing, and the motor housing is coupled to a source of cooling fluid that circulates through the motor housing;
   a dam wall disposed upstream with respect to the melt chamber and downstream with respect to the conveyor, wherein a top of the dam wall is below a melt level in the melt chamber, and wherein the dam wall forms a well upstream of the melt chamber;
   a heater positioned in the well and configured to heat glass batch material prior to flow over the dam wall,
   wherein the conveyor is disposed at a position below a top surface of the glass melt within the melt chamber, and wherein the conveyor is configured to drive the raw batch materials into a lower portion of the well for partial melting by the heater prior to entering the melt chamber, and wherein the conveyor and the dam wall are configured to flow the batch materials upward over the dam wall before the batch materials enter the melt chamber.

2. The furnace set forth in claim 1, wherein the heater comprises a heating element and a conveyor that conveys batch material through the heater toward an outlet of the heater, wherein the outlet of the heater is positioned below a top of the dam wall.

3. The furnace set forth in claim 1 further comprising:
   a plurality of heaters positioned in the well, wherein the heaters heat the glass batch material prior to flow over the dam wall, wherein each of the heaters comprises a heating element and a conveyor that conveys the glass batch material through the heater toward an outlet thereof; and
   a plurality of chutes through which glass batch material is conveyed prior to being conveyed through the heaters.

4. The glass furnace of claim 1 wherein the conveyor is a screw conveyor.

5. The glass furnace of claim 1 wherein the heater includes a gas heating element or an electric heating element.

6. The glass furnace of claim 1 wherein the conveyor includes a first conveyor that drives the batch material to the well and a second conveyor that drives batch through the well.

7. The glass furnace of claim 1 wherein the conveyor extends into the well.

8. The glass furnace of claim 7 wherein the conveyor extends horizontally.

9. The glass furnace of claim 7 wherein the conveyor extends vertically.

10. A glass furnace comprising:
a glass melt;
a melt chamber for containing said glass melt;
a screw conveyor configured to receive glass batch material and feed such material to the melt chamber, wherein the screw conveyor is coupled to an output shaft of a motor surrounded by a motor housing, and the motor housing is coupled to a source of cooling fluid that circulates through the motor housing; and
a dam wall disposed upstream with respect to the melt chamber and downstream with respect to the conveyor, wherein the conveyor and the dam wall are configured to flow the batch materials upward over the dam wall before the batch materials enter the melt chamber.

11. The glass furnace of claim 10 wherein the conveyor is a screw conveyor.

12. The glass furnace of claim 10 wherein the heater includes a gas heating element or an electric heating element.

13. The glass furnace of claim 10 wherein the conveyor includes a first conveyor that drives the batch material to the well and a second conveyor that drives batch through the well.

14. The glass furnace of claim 10 wherein the conveyor extends into the well.

15. The glass furnace of claim 14 wherein the conveyor extends horizontally.

16. The glass furnace of claim 14 wherein the conveyor extends vertically.

17. A glass furnace that includes:
a pool of glass melt;
a melt chamber including a wall and configured to contain said pool of glass melt;
a batch feeder adjacent to the wall of the melt chamber and configured to supply batch material;
a conveyor proximate one end of the batch feeder and configured to receive and convey the batch material;
a dam wall disposed upstream with respect to the melt chamber and downstream of the conveyor at the end of the conveyor and forming a well upstream of the melt chamber, wherein a top of the dam wall is below a melt level in the melt chamber; and,
a heater positioned in the well between the dam wall and the wall of the melt chamber and configured to heat the batch material in the well before flowing over the dam wall into the glass melt,
wherein the conveyor is disposed at a position below a top surface of the glass melt within the melt chamber and wherein the conveyor is configured to drive the raw batch materials into a lower portion of the well for partial melting by the heater prior to entering the melt chamber, and wherein the conveyor and the dam wall are configured to flow the batch materials upward over the dam wall before the batch materials enter the melt chamber.

18. The glass furnace of claim 17 wherein the conveyor is oriented horizontally.

19. The glass furnace of claim 17 wherein the conveyor is oriented vertically.

20. The glass furnace of claim 17 wherein the conveyor is a screw conveyor.

21. The glass furnace of claim 20 wherein the screw conveyor is coupled to an output shaft of a motor, the motor is surrounded by a motor housing, and the motor housing is coupled to a source of cooling fluid that circulates through the motor housing and maintains the motor at an acceptable temperature.

22. The glass furnace of claim 17 wherein the heater includes a gas heating element or an electric heating element.

23. The glass furnace of claim 17 wherein the conveyor includes a first conveyor that drives the batch material to the well and a second conveyor that drives batch through the well.

24. The glass furnace of claim 17 wherein the conveyor extends into the well.

25. The glass furnace of claim 24 wherein the conveyor extends horizontally.

26. The glass furnace of claim 24 wherein the conveyor extends vertically.

27. A glass furnace that includes:
a melt chamber configured to contain a pool of glass melt having a melt level;
a feed chamber proximate a bottom portion of the melt chamber, the feed chamber having an outlet below the melt level;
a conveyor configured to receive batch material and to convey the batch material through the feed chamber toward the outlet of the feed chamber, the conveyor being disposed at least partially within the feed chamber, and coupled to an output shaft of a motor surrounded by a motor housing, and the motor housing is coupled to a source of cooling fluid that circulates through the motor housing;
a dam wall disposed upstream with respect to the melt chamber and downstream of the conveyor, wherein a top of the dam wall is below a melt level in the melt chamber, and wherein the dam wall forms a well upstream of the melt chamber; and
a heater positioned in the well proximate the outlet of the feed chamber and configured to heat glass batch material prior to flow over the dam wall and that at least partially melts the batch material,
wherein the conveyor is disposed at a position below a top surface of the glass melt within the melt chamber and wherein the conveyor is configured to drive the raw batch materials into a lower portion of the well for partial melting by the heater prior to entering the melt chamber, and wherein the conveyor and the dam wall are configured to flow the batch materials upward over the dam wall before the batch materials enter the melt chamber.

28. The glass furnace of claim 27 wherein the conveyor is oriented generally horizontally within the feed chamber.

29. The glass furnace of claim 27 wherein the heater is disposed within the feed chamber such that batch material exiting the feed chamber is forced through or past the heater.

30. The glass furnace of claim 27 wherein the heater is disposed to heat batch material prior to flow over the dam wall.

31. The glass furnace of claim 27 wherein the dam wall forms the well at one end of the feed chamber that separates the feed chamber from the melt chamber.

32. The glass furnace of claim 31 wherein the well is part of the feed chamber and the conveyor is oriented generally vertically within the feed chamber.

33. The glass furnace of claim 32 wherein the feed chamber has a sloped bottom feed wall that aids in maintaining an even flow of batch material to the vertically oriented conveyor.

34. The glass furnace of claim 27 including:
a batch feeder that supplies batch material to the feed chamber.

35. The glass furnace of claim 34 wherein the batch feeder is adjacent a side wall of the melt chamber and supplies batch material under gravity to the feed chamber.

36. The glass furnace of claim 27 wherein the outlet of the feed chamber defines an opening in a side wall of the melt chamber.

37. The glass furnace of claim 36 wherein the opening in the side wall of the melt chamber defines a plane, and wherein the end of the screw conveyor is in approximate alignment with the plane of the opening.

38. The glass furnace of claim 37 wherein the heater comprises a submerged heater proximate a bottom wall of the melt chamber, wherein the heater heats the batch material passing through the opening in the side wall of the melt chamber into the melt chamber.

39. The glass furnace of claim 27 wherein the conveyor is a screw conveyor.

40. The glass furnace of claim 27 wherein the heater includes a gas heating element or an electric heating element.

41. The glass furnace of claim 27 wherein the conveyor includes a first conveyor that drives the batch material to the well and a second conveyor that drives batch through the well.

42. The glass furnace of claim 27 wherein the conveyor extends into the well.

43. The glass furnace of claim 42 wherein the conveyor extends horizontally.

44. The glass furnace of claim 42 wherein the conveyor extends vertically.

* * * * *